(12) United States Patent
Yoo et al.

(10) Patent No.: US 8,250,776 B2
(45) Date of Patent: *Aug. 28, 2012

(54) METHOD OF MANAGING OPERATION OF LAUNDRY ROOM MACHINE AND DRYER THEREFOR

(75) Inventors: Hea-Kyung Yoo, Changwon-shi (KR); Tae-Hoon Lim, Changwon-shi (KR)

(73) Assignee: LG Electronics Inc., Seoul (KR)

( * ) Notice: Subject to any disclaimer, the term of this patent is extended or adjusted under 35 U.S.C. 154(b) by 722 days.

This patent is subject to a terminal disclaimer.

(21) Appl. No.: 11/753,025

(22) Filed: May 24, 2007

(65) Prior Publication Data
US 2008/0005924 A1    Jan. 10, 2008

(30) Foreign Application Priority Data
May 26, 2006   (KR) .................. 10-2006-0047738

(51) Int. Cl.
*F26B 3/00* (2006.01)
(52) U.S. Cl. ............... 34/486; 34/495; 68/3 R; 68/13 R; 705/14; 700/19; 70/159; 194/317; 194/346
(58) Field of Classification Search .............. 34/380, 34/381, 413, 386, 497, 495; 705/14; 700/19; 70/159; 194/317, 346; 68/3 R, 13 R
See application file for complete search history.

(56) References Cited

U.S. PATENT DOCUMENTS

| | | | | |
|---|---|---|---|---|
| 2,599,722 A | * | 6/1952 | Rourke, Jr. et al. | 194/242 |
| 2,924,319 A | * | 2/1960 | Maurer | 194/283 |
| 3,047,187 A | * | 7/1962 | Taylor et al. | 220/378 |
| 3,050,867 A | * | 8/1962 | Friedman | 34/86 |
| 3,076,107 A | * | 1/1963 | Johnston | 307/141.4 |
| 3,103,112 A | * | 9/1963 | Behrens et al. | 68/18 R |
| 3,110,384 A | * | 11/1963 | Rub | 194/217 |
| 3,110,385 A | * | 11/1963 | Eickhoff | 194/296 |
| 3,114,443 A | * | 12/1963 | New | 194/222 |
| 3,128,866 A | * | 4/1964 | Ratowsky | 194/221 |
| 3,155,210 A | * | 11/1964 | New | 194/346 |
| 3,161,481 A | * | 12/1964 | Edwards | 34/527 |
| 3,167,165 A | * | 1/1965 | Danielson et al. | 194/243 |

(Continued)

FOREIGN PATENT DOCUMENTS
GB       2 234 837 A     2/1991
(Continued)

OTHER PUBLICATIONS

Korean Office Action dated Jun. 30, 2012.

*Primary Examiner* — Stephen M. Gravini
(74) *Attorney, Agent, or Firm* — KED & Associates LLP (57) ABSTRACT

A method of operating and managing a laundry room machine that performs a washing operation and a drying operation according to a payment made by customers is provided. The method includes setting information of payments and operating conditions and setting operating conditions according to a payment additionally inserted while a drying operation is performed, receiving information of a payment insertion from the payment device and operating a predetermined operation according to the set operating conditions, and receiving information of an additional payment insertion from the payment device while a drying operation is performed and performing an additional drying operation according to the information of the additional payment insertion based on the setting operating conditions according to the payment additionally inserted while the drying operation is performed.

3 Claims, 6 Drawing Sheets

U.S. PATENT DOCUMENTS

| | | | | |
|---|---|---|---|---|
| 3,168,947 | A | * | 2/1965 | Greenwald .................. 194/236 |
| 3,194,378 | A | * | 7/1965 | Greenwald .................. 194/244 |
| 3,197,006 | A | * | 7/1965 | Rub et al. ..................... 194/242 |
| 3,204,741 | A | * | 9/1965 | Maxwell et al. ............. 194/208 |
| 3,221,862 | A | * | 12/1965 | Taylor .......................... 194/226 |
| 3,234,449 | A | * | 2/1966 | Lang et al. ................... 318/461 |
| 3,248,801 | A | * | 5/1966 | Morton et al. ................. 34/572 |
| 3,255,859 | A | * | 6/1966 | Simard et al. ................ 194/296 |
| 3,269,508 | A | * | 8/1966 | Eckes ............................ 194/297 |
| 3,270,529 | A | * | 9/1966 | Engel ........................... 68/18 F |
| 3,270,530 | A | * | 9/1966 | Czech ........................... 68/18 R |
| 3,273,256 | A | * | 9/1966 | Behrens ......................... 34/546 |
| 3,292,760 | A | * | 12/1966 | Rudin ........................... 194/292 |
| 3,297,123 | A | * | 1/1967 | Hutchins ...................... 194/343 |
| 3,360,092 | A | * | 12/1967 | McConnell ................... 194/223 |
| 3,362,515 | A | * | 1/1968 | Yamamoto et al. .......... 194/210 |
| RE26,957 | E | * | 9/1970 | McConnell ................... 194/241 |
| 3,531,791 | A | * | 9/1970 | Wells ............................ 340/649 |
| 3,576,137 | A | * | 4/1971 | Zinninger ....................... 74/130 |
| 3,587,807 | A | * | 6/1971 | Hickman ...................... 194/221 |
| 3,590,654 | A | * | 7/1971 | Butte .............................. 74/491 |
| 3,605,509 | A | * | 9/1971 | Harris, Sr. ...................... 74/130 |
| 3,624,918 | A | * | 12/1971 | Heftler ........................... 34/549 |
| 3,632,988 | A | * | 1/1972 | Yamawaki et al. ........... 235/381 |
| 3,712,440 | A | * | 1/1973 | Greenwald ................... 194/235 |
| 3,728,074 | A | * | 4/1973 | Victor ............................... 8/142 |
| 3,731,777 | A | * | 5/1973 | Burke et al. .................. 194/217 |
| 3,771,238 | A | * | 11/1973 | Vaughn ............................ 34/86 |
| 3,774,742 | A | * | 11/1973 | Magnanelli ................... 194/342 |
| 3,872,958 | A | * | 3/1975 | Greenwald et al. .......... 194/259 |
| 3,877,152 | A | * | 4/1975 | Gorman ......................... 34/524 |
| 3,905,460 | A | * | 9/1975 | Greenwald et al. .......... 194/350 |
| 3,918,566 | A | * | 11/1975 | Kaiser et al. ................. 194/337 |
| 3,944,040 | A | * | 3/1976 | Richard ........................ 194/292 |
| 3,948,376 | A | * | 4/1976 | Roman .......................... 194/317 |
| 3,990,318 | A | * | 11/1976 | Cahoe et al. ................... 74/128 |
| 4,023,419 | A | * | 5/1977 | Harris .............................. 74/30 |
| 4,044,875 | A | * | 8/1977 | Greenwald et al. .......... 194/344 |
| 4,094,396 | A | * | 6/1978 | Greenwald ................... 194/226 |
| 4,122,729 | A | * | 10/1978 | Mitchel .......................... 74/128 |
| 4,128,156 | A | * | 12/1978 | Greenwald et al. .......... 194/256 |
| 4,131,190 | A | * | 12/1978 | Gitlin ............................ 194/202 |
| 4,139,086 | A | * | 2/1979 | Fafard .......................... 194/330 |
| 4,151,730 | A | * | 5/1979 | Wendel ............................ 68/20 |
| 4,155,438 | A | * | 5/1979 | Greenwald ................... 194/209 |
| 4,161,214 | A | * | 7/1979 | Wendel ......................... 165/172 |
| 4,187,701 | A | * | 2/1980 | Wendel ............................ 68/20 |
| 4,197,932 | A | * | 4/1980 | Mercurio ...................... 194/238 |
| 4,221,285 | A | * | 9/1980 | Greenwald et al. .......... 194/318 |
| 4,275,510 | A | * | 6/1981 | George ............................ 34/90 |
| 4,281,755 | A | * | 8/1981 | Levine .......................... 194/253 |
| 4,287,396 | A | * | 9/1981 | Greenwald .................. 200/35 R |
| 4,335,591 | A | * | 6/1982 | Gillespie ..................... 68/12.23 |
| 4,336,619 | A | * | 6/1982 | Hinkel et al. ................... 4/619 |
| RE31,085 | E | * | 11/1982 | Greenwald et al. .......... 194/234 |
| 4,390,965 | A | * | 6/1983 | Albert ............................ 700/90 |
| 4,406,358 | A | * | 9/1983 | Zahradnik .................... 194/350 |
| 4,418,398 | A | * | 11/1983 | Hornung ....................... 713/100 |
| 4,484,673 | A | * | 11/1984 | Cohen ........................... 194/346 |
| 4,507,942 | A | * | 4/1985 | Hirose et al. .................... 68/20 |
| 4,509,630 | A | * | 4/1985 | Mongelli ...................... 194/343 |
| 4,509,633 | A | * | 4/1985 | Chow ........................... 194/334 |
| 4,510,778 | A | * | 4/1985 | Cotton ........................ 68/12.15 |
| 4,513,199 | A | * | 4/1985 | Sidline ......................... 235/449 |
| 4,515,261 | A | * | 5/1985 | Prisant ......................... 194/350 |
| 4,544,058 | A | * | 10/1985 | Choderker et al. ........... 194/325 |
| 4,545,474 | A | * | 10/1985 | Ridgley et al. ............... 194/350 |
| 4,546,554 | A | * | 10/1985 | Bullock et al. ................. 34/554 |
| 4,555,639 | A | * | 11/1985 | Melek ............................ 307/38 |
| 4,588,064 | A | * | 5/1986 | Monfredi ..................... 194/238 |
| 4,663,538 | A | * | 5/1987 | Cotton et al. ................... 307/38 |
| 4,663,861 | A | * | 5/1987 | Scriber .......................... 34/443 |
| 4,797,656 | A | * | 1/1989 | Keppler ..................... 340/539.26 |
| 4,884,672 | A | * | 12/1989 | Parker .......................... 194/318 |
| 4,891,890 | A | * | 1/1990 | Church .......................... 34/389 |
| 4,903,282 | A | * | 2/1990 | Botker ............................. 377/7 |
| 4,903,816 | A | * | 2/1990 | Reeder et al. ................ 194/350 |
| 4,907,250 | A | * | 3/1990 | Ricks .............................. 377/7 |
| 5,042,635 | A | * | 8/1991 | Bell ............................. 194/346 |
| 5,056,644 | A | * | 10/1991 | Parker .......................... 194/318 |
| 5,070,518 | A | * | 12/1991 | Botker ............................. 377/7 |
| 5,109,972 | A | * | 5/1992 | Van Horn et al. ............ 194/217 |
| 5,172,577 | A | * | 12/1992 | Gibson ........................... 70/272 |
| 5,201,396 | A | * | 4/1993 | Chalabian et al. ............ 194/217 |
| 5,311,975 | A | * | 5/1994 | Hiortdahl ..................... 194/235 |
| 5,316,124 | A | * | 5/1994 | Barnes et al. ................. 194/206 |
| 5,369,892 | A | * | 12/1994 | Dhaemers ....................... 34/275 |
| 5,386,362 | A | * | 1/1995 | Keret ............................. 705/30 |
| 5,451,932 | A | * | 9/1995 | Wunderlich et al. ......... 340/635 |
| 5,454,932 | A | * | 10/1995 | Tardif et al. ................ 206/387.1 |
| 5,467,077 | A | * | 11/1995 | Wunderlich et al. ......... 340/635 |
| 5,526,918 | A | * | 6/1996 | Dullighan et al. ............ 194/317 |
| 5,546,678 | A | * | 8/1996 | Dhaemers ....................... 34/275 |
| 5,566,808 | A | * | 10/1996 | Parker et al. ................. 194/317 |
| 5,619,614 | A | * | 4/1997 | Payne et al. ..................... 706/1 |
| 5,648,906 | A | * | 7/1997 | Amirpanahi .................. 705/418 |
| 5,655,394 | A | * | 8/1997 | DiRocco, Jr. ................... 70/159 |
| 6,298,973 | B1 | * | 10/2001 | Meade et al. ................. 194/318 |
| 6,356,881 | B1 | * | 3/2002 | Milch et al. .................... 705/41 |
| 6,598,725 | B2 | * | 7/2003 | Wilfong ....................... 194/200 |
| 6,687,112 | B2 | * | 2/2004 | Chiou et al. .................. 361/160 |
| 6,708,811 | B2 | * | 3/2004 | Roscoe ......................... 194/215 |
| 6,856,841 | B2 | * | 2/2005 | Peterson ........................ 700/19 |
| 6,862,482 | B2 | * | 3/2005 | Peterson et al. ................ 700/19 |
| 7,082,695 | B1 | * | 8/2006 | Wong et al. .................... 34/486 |
| D539,490 | S | * | 3/2007 | Sans Rovira et al. ........... D32/6 |
| 7,263,787 | B2 | * | 9/2007 | Besaw ............................. 34/62 |
| 7,269,979 | B2 | * | 9/2007 | Lyu et al. ........................ 68/3 R |
| 7,344,287 | B2 | * | 3/2008 | DeBusscher ................. 362/414 |
| 7,410,095 | B2 | * | 8/2008 | Selover .......................... 232/16 |
| D587,865 | S | * | 3/2009 | Cadamuro ..................... D32/5 |
| 7,509,824 | B2 | * | 3/2009 | Park et al. .................. 68/12.23 |
| 7,562,543 | B2 | * | 7/2009 | Kendall et al. ............... 68/13 R |
| 2001/0052193 | A1 | * | 12/2001 | Payet et al. .................... 34/444 |
| 2003/0042110 | A1 | * | 3/2003 | Wilfong ....................... 194/302 |
| 2006/0162182 | A1 | * | 7/2006 | Wong et al. .................... 34/486 |
| 2007/0017119 | A1 | * | 1/2007 | Besaw ........................... 34/602 |
| 2007/0114108 | A1 | * | 5/2007 | Richards ...................... 194/344 |
| 2007/0283592 | A1 | * | 12/2007 | Slutsky ......................... 34/446 |
| 2008/0040944 | A1 | * | 2/2008 | Slutsky ......................... 34/327 |
| 2008/0040946 | A1 | * | 2/2008 | Slutsky ......................... 34/528 |
| 2008/0184588 | A1 | * | 8/2008 | Somod et al. ................. 34/495 |

FOREIGN PATENT DOCUMENTS

| | | | | |
|---|---|---|---|---|
| JP | 63228294 | A | * | 9/1988 |
| JP | 06190198 | A | * | 7/1994 |
| JP | 2005-185460 | | | 7/2005 |

* cited by examiner

METHOD OF MANAGING OPERATION OF LAUNDRY ROOM MACHINE AND DRYER THEREFOR

TECHNICAL FIELD

The present invention relates to a method of operating and managing a laundry room machine for performing a washing operation and a drying operation according to a payment made by customers, and more particularly, to a method of operating and managing a laundry room machine for performing an additional drying operation to control a dry state of the laundry in response to additional payment made by customer, and a dryer therefor.

BACKGROUND ART

In general, a laundry room machine is an appliance used for cleaning the laundry such as clothes and beddings. The laundry room machine automatically washes, rinses, and spin-dries the laundry, and dries the laundry with hot air to quickly dry the laundry. The laundry room machine includes a washer, a dryer, and an all-in-one washer and dryer.

Such laundry room machines may be classified into a domestic laundry room machine and a commercial laundry room machine.

The domestic laundry room machine is disposed at a private place such as home and generally used for washing the laundry of family members.

On the contrary, the commercial laundry room machine is disposed at a public place such as a business building and rented to customers at a predetermined rate. Compared with the domestic laundry room machine, the commercial laundry room machines are frequently used by many customers. Therefore, the commercial laundry room machines need to be designed and manufactured to have superior stability and maintainability. Also, the commercial laundry room machines are designed to have a manager mode for enabling managers to set various operating conditions.

In order to maximize benefit and convenience, the commercial laundry room machine needs a device for handling a payment made by customers for using the laundry room machine and a control algorithm thereof. The commercial laundry room machine also needs a manager mode to protect the laundry room machine from being damaged by customers, to prevent the parts thereof from being lost, and to conveniently and quickly repair the laundry room machine.

A commercial laundry room is generally equipped with a plurality of washers and dryers. Each of the washers and the dryers includes a payment device such as a coin drop assembly for collecting coins or a card reader for collecting electric payments from various cards. When a customer inputs a payment into the payment device, a predetermined operating time is assigned to the washer or the dryer in correspondence with the inputted payment, and the washer or the dryer performs a predetermined operation during the assigned operating time.

After a customer inserts a payment and a corresponding operating time is assigned, the commercial laundry room machine continuously performs selected operations until the laundry is completely dried. That is, the commercial laundry room machine does not allow a customer to control an operating time assigned according to the initially inserted payment. Therefore, a customer may have a difficulty to obtain a desired result of drying the laundry.

DISCLOSURE OF THE INVENTION

The present invention is achieved to solve the above problems. An object of the present invention is to provide a method of operating and managing a laundry room machine, which enables a customer to extend an operating time by inserting additional payment while the laundry room machine is operating.

Another object of the present invention is to provide a method of operating and managing a laundry room machine, which enables a laundry room machine to additionally perform a drying operation by inserting additional payment while the laundry room machine is operating.

In order to achieve the above-described objects of the invention, there is provided a method of operating and managing laundry room machines, which use a laundry room machine disposed in a laundry room for performing at least one of a washing operation and a drying operation, a payment device disposed at the laundry room machine for collecting a payment for operating the laundry room machine, and a communicator for setting operating conditions of the laundry room machine and collecting operating information of the laundry room machine, the method including the step of: a) setting information about payments and operating conditions and setting operating conditions according to a payment additionally inserted while a drying operation is performed; b) receiving information about payment insertion from the payment device and operating a predetermined operation according to the set operating conditions; and c) receiving information about additional payment insertion from the payment device while a drying operation is performed, and performing an additional drying operation for the information about additional payment insertion according to the operating condition set at the step a).

In another aspect of the present invention, there is provided a commercial dryer including: an first interface for communicating payment collecting information with a payment device disposed at the dryer; and a controller for controlling operation of the dryer according to operating information set by communication information of the first interface, and adjusting the set operating information according to additionally inserted payment collecting information.

The commercial dryer may further include: a second interface for communicating at least one of identification information having an ID (identifier) of each laundry room machine, payment information, and operating information with a communicator, and a method of adjusting operating information of a dryer based on additionally inserted payment collecting information through the communicator and the second interface may be set into the controller.

BRIEF DESCRIPTION OF THE DRAWINGS

The present invention will become better understood with reference to the accompanying drawings which are given only by way of illustration and thus are not limitative of the present invention, wherein.

BEST MODE FOR CARRYING OUT THE INVENTION

A method of operating and managing a laundry room machine and a dryer therefor in accordance with preferred embodiments of the present invention will now be described in detail with reference to the accompanying drawings.

Figure 1:
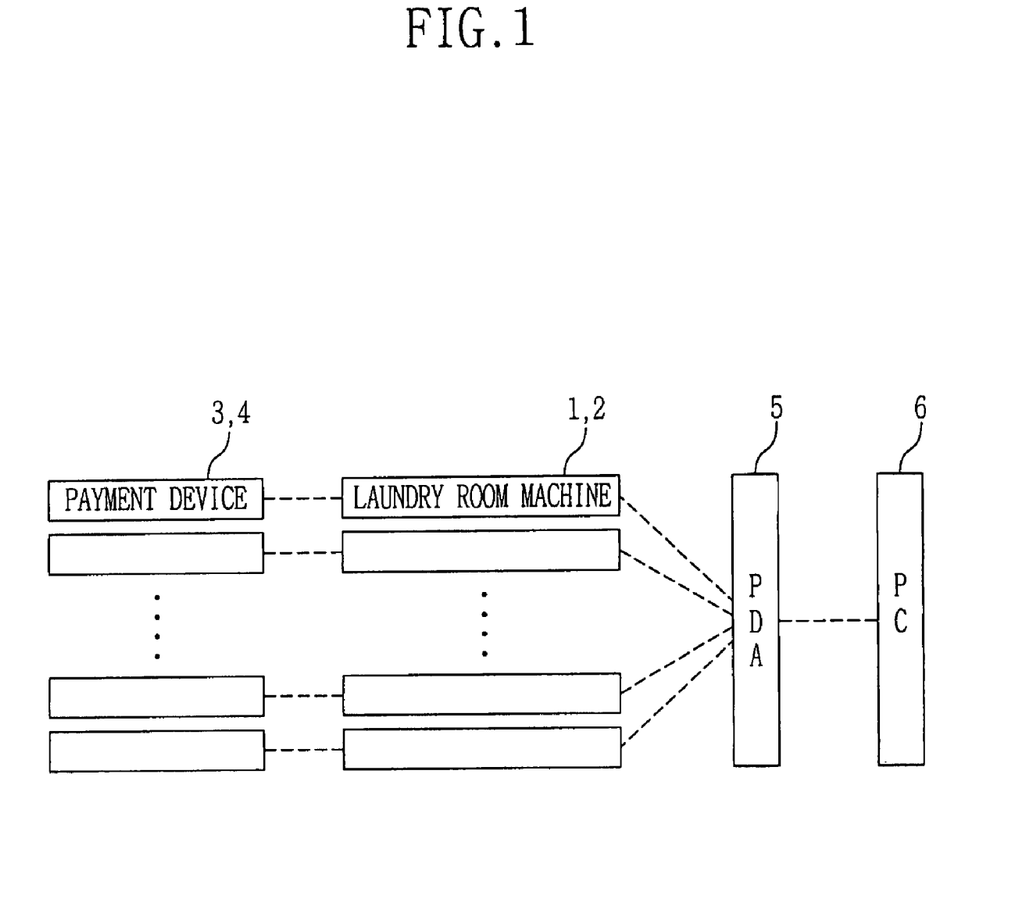
FIG. 1 is a diagram illustrating a commercial laundry room system according to an embodiment of the present invention.
Figure 2:
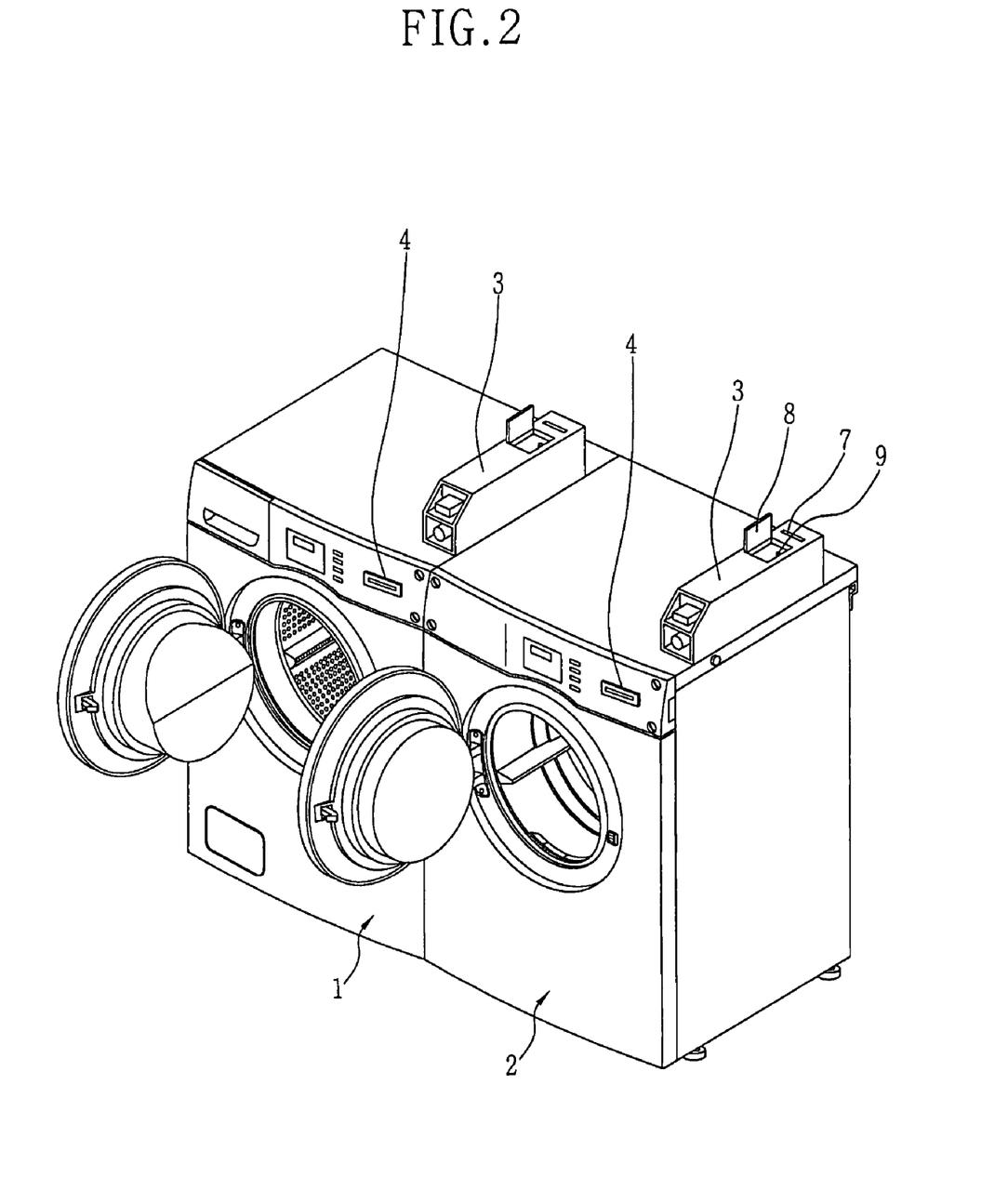
FIG. 2 is a perspective view of a commercial laundry room machine according to an embodiment of the present invention.

FIG. 1 is a diagram illustrating a commercial laundry room system according to an embodiment of the present invention, and FIG. 2 is a perspective view of a commercial laundry room machine according to an embodiment of the present invention.

As shown in FIG. 1 and FIG. 2, the commercial laundry room system includes laundry room machines such as a washer 1 for removing pollutions from the laundry by washing, rinsing, and spin-drying the laundry using water, a detergent, and mechanical power, and a dryer 2 for drying the wet laundry using hot air and mechanical power. Each of the laundry room machines 1 and 2 includes a payment device such as a card reader 3 and a coin drop assembly 4. Furthermore, the laundry room system includes a communicator 5 such as a personal digital assistant (PDA) for setting the operation conditions of the laundry room machines 1 and 2 and receiving the operating information from the laundry room machines 1 and 2, and a personal computer PC 6 for managing the operating information from the communicator 5. The communicator 5 and the computer 6 enable a manager to conveniently manage a plurality of the laundry room machines simultaneously. Each of the laundry room machines 1 and 2 includes an interface (not shown) to communicate with the payment devices 3 and 4 and the communicator 5.

Recently, an all-in-one washer and dryer was introduced. Although the all-in-one washer and dryer can dry the laundry as well as wash, rinse, and spin-dry, the all-in-one washer and dryers have not been frequency used for a commercial purpose because the drying capacity thereof is comparatively smaller than the washing capacity thereof, the price is relatively high, and the structure is complicated.

In general, a commercial laundry room is equipped with a plurality of commercial washers 1 and commercial dryers 2 for accommodating a plurality of customers and maximizing the business benefit. Each of the washers 1 and the dryers 2 include a coin drop assembly 3 and a card reader 4 for collecting and handling a payment from customers.

The coin drop assembly 3 is a device for collecting coins inserted by customer as a payment. Since it is required for the coin drop assembly 3 to store a lot of coins and to mechanically process the stored coins, the coin drop assembly 3 generally has a large external shape and a heavy weight. Therefore, the coin drop assembly 3 is disposed on a top side of the washer 1 and the dryer 2. On the contrary, the card reader 4 is a device for collecting an electric payment that is made through a magnetic card or an integrated circuit (IC) card. Since the card reader 4 electrically reads and processes the cards, the card reader 4 is internally disposed in the washer 1 and the dryer 2.

In order to maximize the convenience of customers, the washers and the dryers generally include the both of the coin drop assembly 3 and the card reader 4.

Since the laundry room machines 1 and 2 are used for a commercial purpose, the laundry room machines 1 and 2 provide a management mode to enable a manager to set operating conditions of the washer 1 and the dryer 2 such as the rate and operating times, and to repair the washer 1 and the dryer. A manager can set the laundry room machines 1 and 2 to enter the manager mode through the communicator 5. However, a manager generally sets the laundry room machines to enter the manger mode by turning a service door key after inserting the service door key into a key hole 7 formed at the coin drop assembly 3 or inserting a service card into the card reader 4.

When a manager turns the service door key after inserting the service door key into the key hole 7, a contact door 8 of the coin drop assembly 3 opens and the opened contact door 8 releases a limit switch 9 to enable a manager to pull out a coin box from the coin drop assembly 3.

Figure 3:
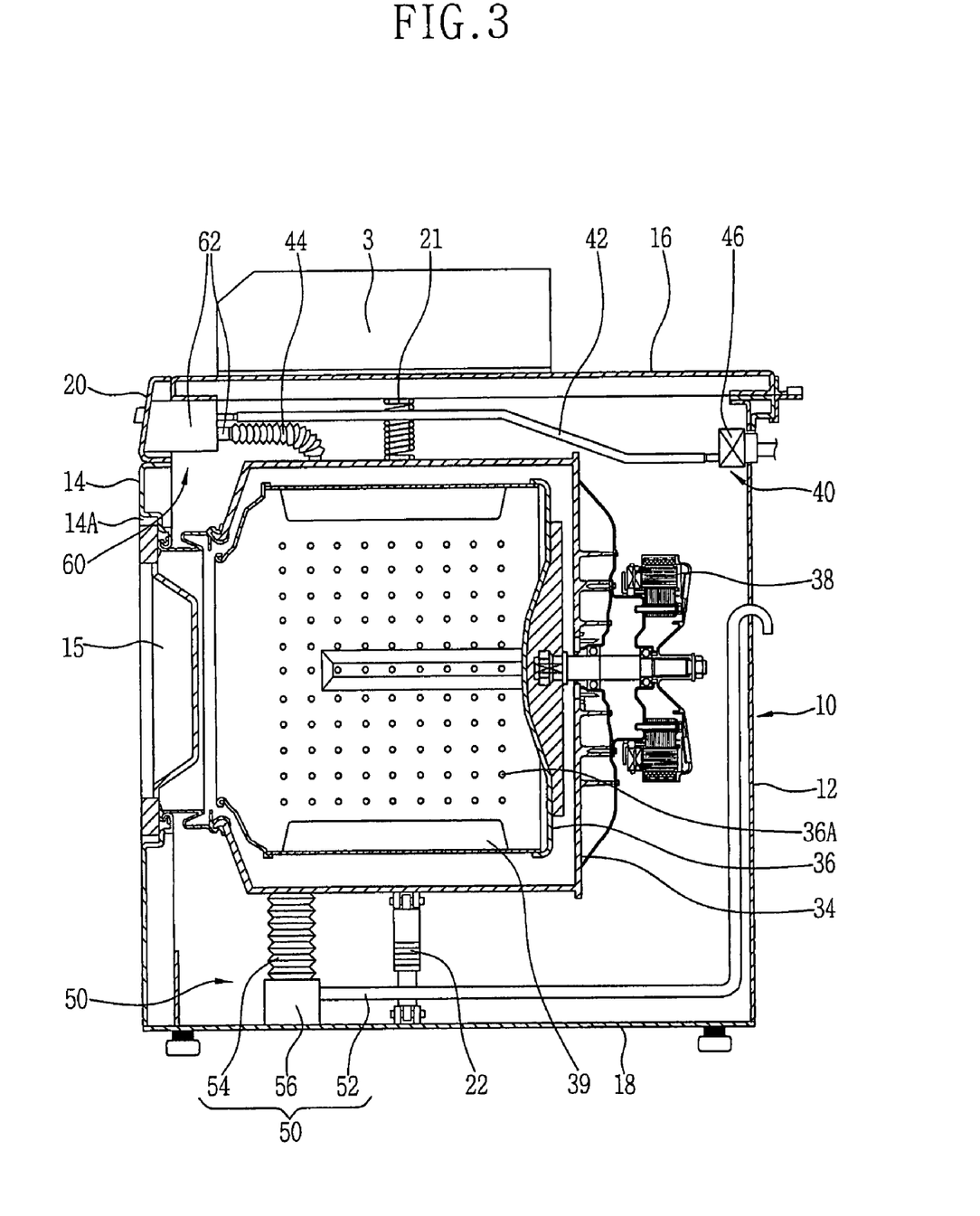
FIG. 3 is a side cross-sectional view of a commercial washer according to an embodiment of the present invention.
Figure 4:
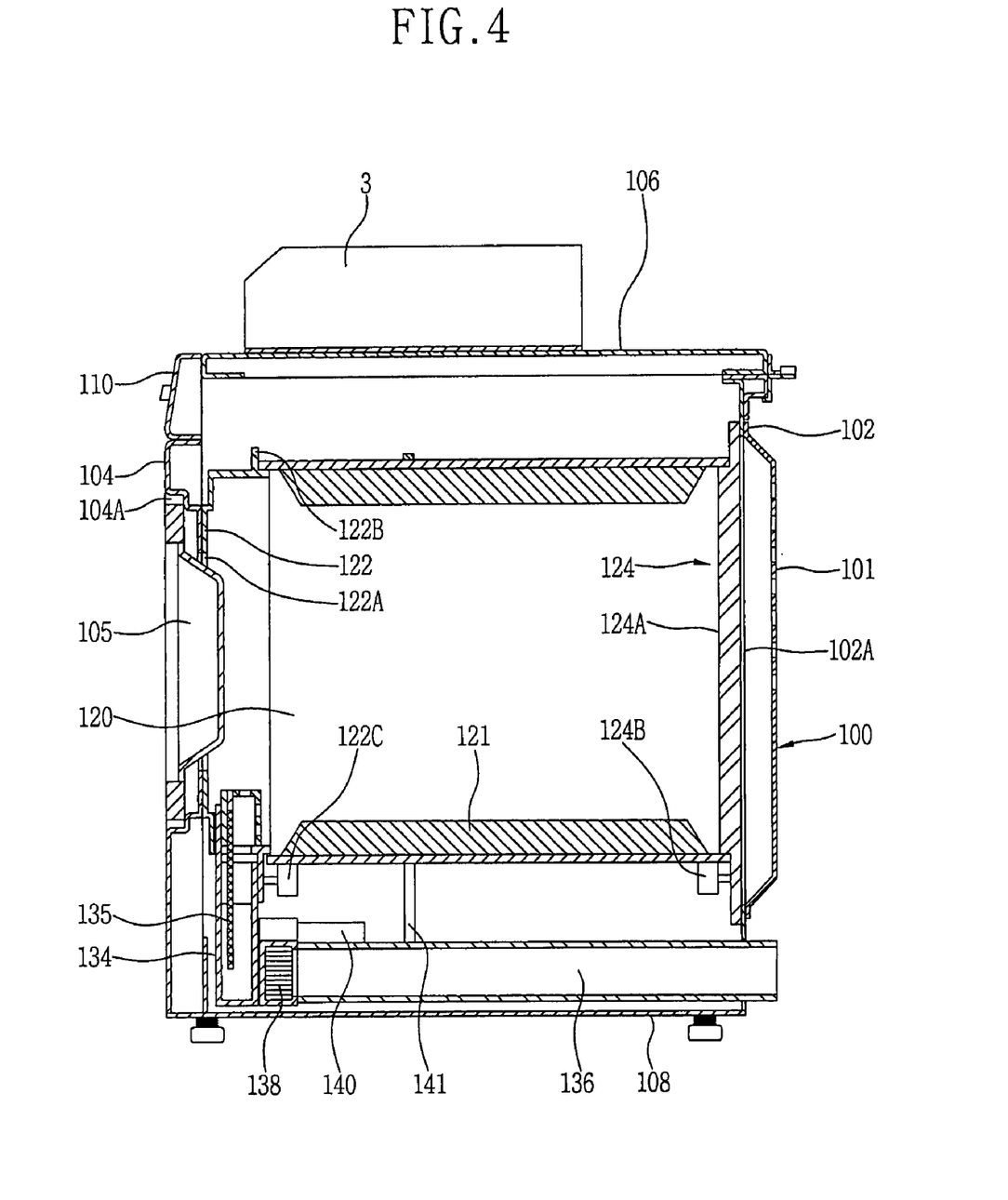
FIG. 4 is a side cross-sectional view of a commercial dryer according to an embodiment of the present invention.
Figure 5:
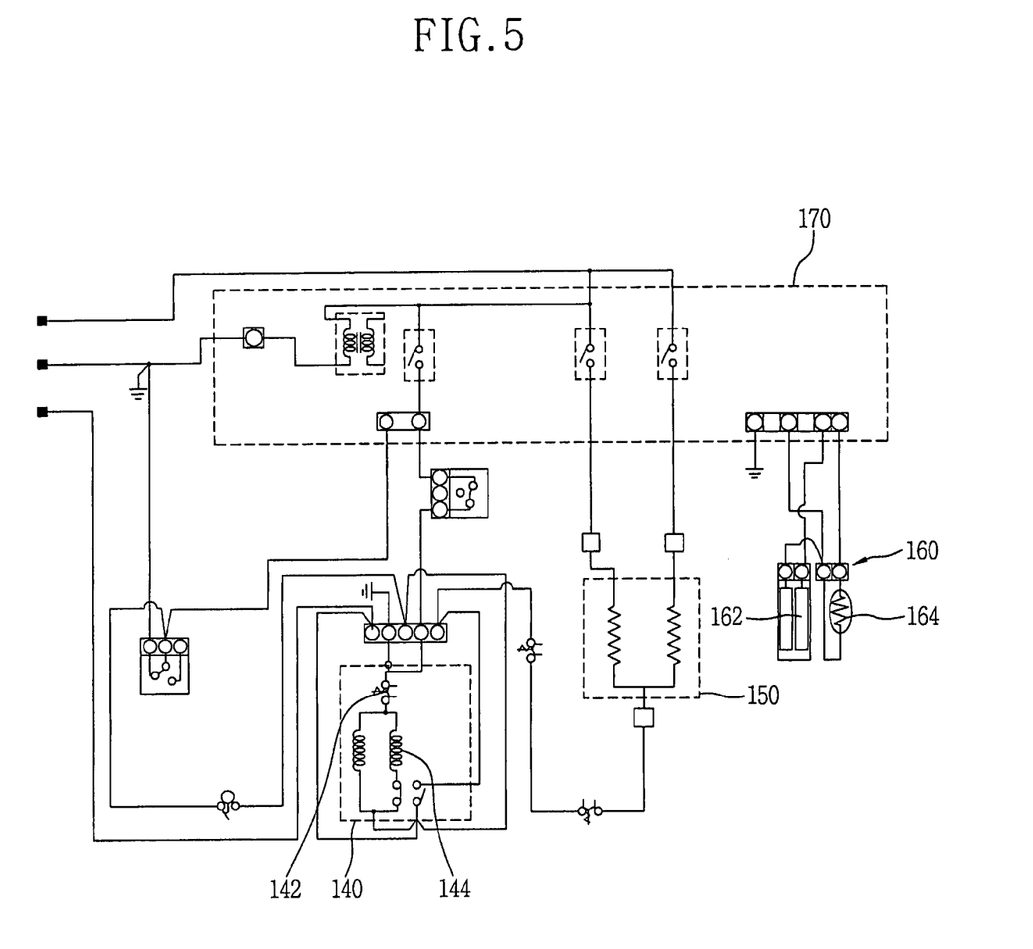
FIG. 5 is a circuit diagram illustrating a control block of a dryer according to an embodiment of the present invention.

FIG. 3 is a side cross-sectional view of a commercial washer according to an embodiment of the present invention, FIG. 4 is a side cross-sectional view of a commercial dryer according to an embodiment of the present invention, and FIG. 5 is a circuit diagram illustrating a control block of a dryer according to an embodiment of the present invention.

Referring to FIG. 3, the washer according to the present embodiment includes a cabinet 10 forming the exterior of the washer, and a control panel 20 disposed at an upper front side of the washer for inputting information to control the operation of the washer and displaying information about the progress of washing operations at the same time. Also, the washer according to the present embodiment includes a tub 34 and a drum 36 disposed inside the cabinet 10 for receiving the laundry, and a motor 38 disposed at the rear side of the tub 34 for rotating the drum 36. The motor 38 is controlled by a controller (not shown) embedded in the control panel 20.

In the cabinet 10, the washer according to the present invention includes a water supply unit 40 for supplying water to the tub 34, a drain unit 50 for draining water from the tub 34, and a detergent supply unit 60 for supplying a detergent into water supplied into the tub 34.

The cabinet 10 includes a case 12 having an opened front side, an opened top side, and a bottom side, which are opened, a front cover 14 for covering the opened front side of the case 12, a top plate 16 for covering the opened top side of the case 12, and a base 18 for covering the opened bottom side of the case 12. The front cover 14 also has an opening 14A for putting the laundry in the drum 36 and taking out the laundry from the drum 36.

A door 15 is rotatably connected to one side of the opening 14A of the front cover 14 in order to open or close the opening 14A of the front cover 14.

A spring 21 and a damper 22 elastically support the tub 34 disposed in the cabinet 10. The drum 36 includes a plurality of water holes 36A for letting water pass through. The motor 38 is disposed at the rear side of the tub 34 for rotating the drum 36.

A plurality of lifters 39 are disposed on an inner circumference face of the drum 36. The lifters 39 lift up the laundry at a predetermined height and let the laundry to be free fallen by gravity. Generally, three lifters 39 are disposed.

The water supply unit 40 includes a water supply hose 42 and a water bellows 44 for guiding water from the external water source to the inside of the tub 34, and a water supply valve 46 disposed on the water supply hose 42 for opening and closing the water supply hose 42.

The detergent supply unit 60 is disposed between the water supply hose 42 and the water supply bellows 46 to communicate with each others in order to supply a detergent to the tub 34 with the water supplied by the water supply unit 40. The water supply hose 42 is disposed between the water supply valve 46 and the detergent supply unit 60 to guide the water to the detergent supply unit 60.

The detergent supply unit 60 includes a detergent box housing 62 having an opened front side connected to the water supply bellows 44 of the water supply unit 40 to communicate with each others, a detergent box (not shown) disposed in the detergent box housing 62 to be taken out therefrom in a front and rear direction for housing the detergent, and a dispenser cover (not shown) disposed at the opened front side of the detergent box housing 62 and connected to the water supply horse 42 of the water supply unit 40 to communicate with each other for draining water from the detergent box.

The drain unit 50 includes a drain hose 52 and a drain bellows 54 connected to the bottom of the tub 34 and penetrating the rear side of the cabinet 10 for guiding wasted water to the outside, and a drain pump 56 for generating a draining power.

The washer includes the coin drop assembly 3 disposed on the top of the top plate and the card reader 4 disposed on the front side of the control panel 20. The controller (not shown) embedded in the control panel 10 provides an operating time according to a payment inserted into the coin drop assembly 3 and the card reader 4. The controller also controls the operation of the washer and displays information about handling of the payment to customers at the same time.

As described above, a manager can set the washer to activate a manager mode by turning a service key after inserting the service door key into a key hole 7 formed in the coin drop assembly 3, or by inserting a service card into the card reader 4. In the manager mode, a manager can control operating conditions such as an operating time assigned according to a payment.

As shown in FIG. 4, the dryer 2 includes a cabinet 100 for forming an exterior of the dryer 2 and a control panel 110 disposed on an upper front side of the cabinet 100 for inputting information to control the operation of the dryer 2 and displaying information about the progress of drying operation. In the cabinet 100, a drum 120, a drying space, is disposed rotatable by a motor 140. The motor 140 is connected by a controller (not shown) embedded in the control panel 110.

In the cabinet 100, a heater (not shown) is disposed to dry the laundry loaded in the drum 120, and a ventilator 138 is disposed to forcedly ventilate an air inside the drum 120. A channel may be further disposed to circulate the air.

The cabinet 100 includes a case 102, a front cover 104 disposed at the front side of the case 102 and having an opening 104A, a top plate 106 disposed on the top side of the case 102, a base 108 disposed at the bottom of the case 102, and a back cover 101 for covering a center part of an opened rear side of the case 102.

A door 105 is rotatably connected to one side of the opening 104A of the front cover 104 to open and close the opening 104A of the front cover 104.

The drum 120 is formed in a barrel shape having a front side and a rear side opened. A transmission belt 141 is disposed between the motor 140 and the drum 120 to transfer the driving force from the motor 140 to the drum 120. Also, a plurality of lifters 121 are disposed inside the drum 120 to left up the laundry loaded in the drum 120 at a predetermined height and to let the laundry to be free fallen to unwrinkle the laundry.

The front cover 104 is disposed at the opened front side of the drum 120 and a front supporter 122 having an opening 122A to enable a predetermined part of the door 105 to be inserted therein.

The front supporter 122 rotatably supports the drum 120 and covers the opened front side of the drum 120 with the door 105 that closes the opening 104A of the front cover 104.

That is, the front supporter 122 includes a ring shaped guiding protrusion 122B contacted to the front inner circumference face of the drum 120 for guiding the front side of the drum 120 to rotate, and a front guide roller 122C for lifting up the front side of the drum 120 from the bottom thereof for rotatably supporting the drum 120.

The opened rear side of the drum 120 is covered by a rear supporter 124 that is disposed at the rear side of the case 102 and rotatably support the drum 120.

The rear supporter 124 includes a disk shaped guiding member 124A projected in a form of a step and contacted to a rear inside circumference of the drum 120 for guiding the rear side of the drum 120 to rotate, and a rear guide roller 124B lifting up the rear side of the drum 120 from the bottom for rotatably supporting the rear side of the drum 120.

The heater is disposed under the drum 120 and heats an air for drying the laundry loaded in the drum 120. The ventilator circulates the heated air along the channel to dry out humidity.

The channel is disposed to connect the heater to the rear supporter 124. The channel includes an air supply duct 132 for guiding an air heated by the heater to the inside of the drum 120, a lint duck 134 connected to the bottom of the front supporter 122 for inhaling the air from the drum 120, and an exhaust duct 136 connected to the lint duct 134 and penetrating the lower rear side of the case 102 for guiding the air in the lint duct 134 to the outside. The ventilator 138 is disposed between the exhaust duct 136 and the lint duct 134, rotatably with the drum 120 by the motor 140.

In general, a burner is used as the heater. Since the burner heats air through oxidation of gas to generate hot air, the heater is connected to the air supply duct 132 and a hollow fennel (not shown) to communicate with each other. The heater is also connected to the external gas supply source through a gas pipe (not shown).

A gas control valve (not shown) is disposed at the joint of the heater and the gas pipe 144 to manually control the flow of gas. It is preferable that a filter 135 is disposed for purifying air inputted to the lint duct 134.

The dryer includes the coin drop assembly 3 disposed on the top of the top plate and the card reader 4 disposed on the front side of the control panel 20. The controller (not shown) embedded in the control panel 110 provides an operating time according to a payment inserted into the coin drop assembly 3 and the card reader 4. The controller also controls the operation of the dryer 2 and displays information about handling of the payment to customers at the same time.

As described above, a manager can set the dryer to activate a manager mode by turning a service key after inserting the service door key into a key hole 7 formed in the coin drop assembly 3, or by inserting a service card into the card reader 4. In the manager mode, a manager can control operating conditions such as an operating time assigned according to a payment.

Hereinafter, a control block of the dryer will be described with reference to FIG. 5. Referring to FIG. 5, a controller 170 controls a ventilator 138, a motor 140, and a heater 150 based on data sensed by a sensor 160.

As described above, the motor 140 is connected to the drum 120 for rotating the drum 120. The motor 140 includes an overload protector 142 for preventing the motor 140 from being overheated when too much laundry is loaded in the drum 120, and a sensing switch 144 for sensing a centrifugal force made by the rotation of the motor 120.

As described above, the heater 150 is disposed on a channel communicating with the drum 120 to supply hot air to the drum 120. An electrical heater or a gas heater may be used as the heater 150.

The sensor 160 measures an inside state of the drum 120 in order to detect the condition of the laundry. In the present embodiment, the sensor 160 includes a humidity sensor 162 and a temperature sensor 164. It is preferable that the humidity sensor 160 and the temperature sensor 164 may be disposed at the drum 120 to measure the inside humidity and the inside temperature in the drum 120

The controller 170 is connected to the coin drop assembly 3 and the card reader 4 for receiving information about payment insertion from the coin drop assembly 3 and the card reader 4.

The controller 170 receives the payment insertion information from the coin drop assembly 3 or the card reader 4, and control the power supplied to the ventilator 138, the heater 140, and the motor 140 to supply hot air to the laundry for a predetermined dry time which is set according to a dry course selected through an input unit (not shown) of the control panel 110.

The controller 170 receives information about the measured inside humidity and temperature of the drum 120 from the humidity sensor 162 and the temperature sensor 164, and controls the ventilator 138, the heater 150, and the motor 140 based on the received information to dry the laundry.

The drying operation includes a heating phase in which the heater 150 and the ventilator 138 are operated to dry the laundry with hot air, and a cooling phase in which the ventilator 138 is only operated without the heater 150 to cool down the laundry. The controller 170 receives information about the temperature and the humidity of the laundry from the humidity sensor 162 and the temperature sensor 164 during the heating phase. If the controller 170 determines that the laundry is properly dried based on the received information about the temperature and humidity, the controller 170 changes the heating phase to the cooling phase.

Recently, the drying operation is generally set to automatically change the heating phase to the cooling phase at a predetermined time before the drying operation completely ends in order to completely finish the drying operation within an operating time assigned according to an initially inserted payment.

The laundry may not be properly dried although the drying operation is performed for an operating time assigned according to an initially inserted payment. Therefore, it is preferable to allow a customer to control an operating time by additionally inserting a payment. Also, it is preferable to set a drying operation to be performed sequentially from a heating phase to a cooling phase for an additional operating time although the cooling phase of the drying operation is performed when a payment is additionally inserted.

Since a maximum operating time is sufficient to completely dry the laundry, it is further preferable not to extend an operating time and not to perform additional drying operation although a payment is additionally inserted if an operating time assigned according to an initially inserted payment is the maximum operating time.

Figure 6:
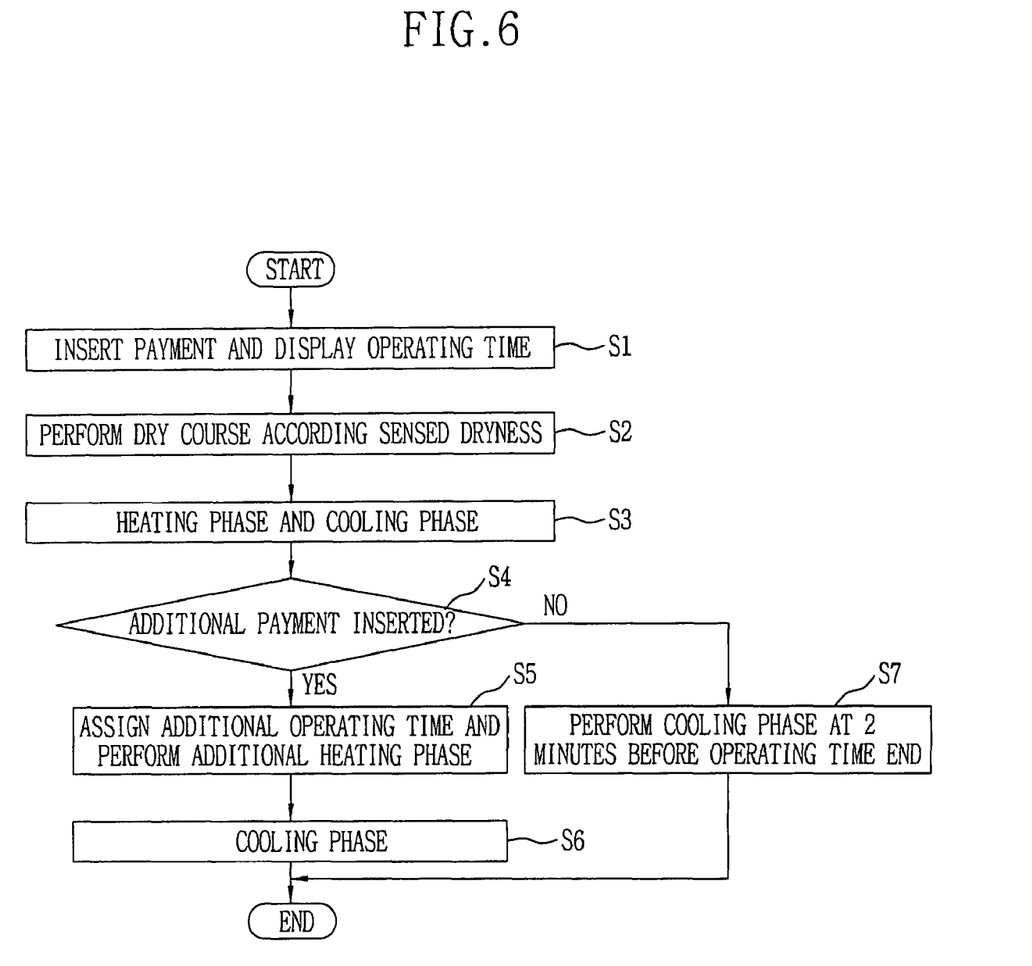
FIG. 6 is a flowchart illustrating a method of operating and managing a commercial laundry room according to an embodiment of the present invention.

FIG. 6 is a flowchart illustrating a method of operating and managing a commercial laundry room machine according to an embodiment of the present invention. Hereinafter, the method of operating and managing a dryer according to the present embodiment will be described with reference to FIG. 6.

At first, when a customer inserts coins into the coin assembly 3 or inputs a card to the card reader 4, a corresponding payment is accepted according to the predetermined rate, and an operating time is assigned according to the payment at step S1.

A customer opens the door 105 of the dryer, puts the wet laundry in the drum 120 through the opening 104A, and closes the door 105 to seal the opening 104A. It is preferable to set the dryer to access a payment after the opening 104A is sealed.

Also, it is preferable to display the accepted payment and the operating time assigned according to the accepted payment on the control panel 110.

A drying operation is performed according to a selected dry course and the dryness of the laundry in the drum 120 is sensed at a regular interval at step S2. The drying operation is sequentially performed from a heating phase and a cooling phase at step S3.

A customer can set a drying course differently according to a type of the laundry. Although the same amount of payment is paid, an operating time can be differently assigned according to a drying course.

After setting a drying course, the heating phase of the drying operation is performed. In the heating phase, the motor 140 rotates the drum 120 and the ventilator 138, and the heater is turned on at the same time. The heater heats air and the heated air is supplied to the inside of the drum 120 through the air supply duct 132. Then, wet air in the drum 120 is exhausted to the outside through the lint duct 134 and the exhaust duct 136.

The lifters 121 tumble the laundry loaded in the drum 120 and the heat air dries the tumbled laundry. While tumbling and drying the laundry, the dryness in the drum 120 is measured by the humidity sensor 162 and the temperature sensor 164. The heating phase of the drying operation is performed until the measured dryness reaches to desired dryness.

If the heating phase ends at a predetermined time before the operating time ends or if a current time reaches a predetermined time before the operating time ends although the heating phase does not end, the cooling phase begins. In the cooling phase, the heater 150 is not operated so the laundry is cooled down.

Although the dryness is measured in the heating phase, the dryness is not measured in the cooling phase. Although the laundry is not completely dried, the heating phase changes to the cooling phase at a predetermined time before the operating time ends. It is preferable to set the predetermined time as about 2 minutes.

If a customer inputs additional payment at step S4, an additional operating time is assigned according to the additional payment and an additional heating phase is performed at step S5. Then, the cooling phase is performed from a predetermined time before the additional operating time ends at step S6.

If the additional payment is inserted when the heating phase is performed, the heating phase is continuously performed in the additional operating time and then a cooling phase is performed. If the additional payment is inserted when the cooling phase is performed, the cooling phase changes to the heating phase and the heating phase is performed for the additional operating time. Then, the cooling phase is performed.

An additional operating time is decided based on an additionally inserted payment and the previously inputted operating conditions. The more the additional payment is inserted, the longer the additional operating time is assigned and the higher the dryness is set.

However, if a maximum operating time, for example about 90 minutes, is assigned according to an initially inserted payment, an additional operating time is not assigned although a payment is additionally inserted. The maximum operating time is sufficient to completely dry the laundry. Therefore, it prevents accidents such as fire, which may occur by the overheated heater 150.

Then, if the additional payment is not inputted, the cooling phase is performed at a predetermined time before the operating time ends at step S7.

As described above, if the laundry is properly dried within the operating time while the heating phase is performed, the heating phase normally changes to the cooling phase. On the contrary, if the laundry is not properly dried within the operating time, the heating phase changes to the cooling phase at a predetermined time before the operating time ends. The predetermined time can be set to various times as well as two minutes.

According to the method of operating and managing the laundry room machine of the present invention, a customer is allowed to extend the initially set operating time by inserting a payment additionally while the laundry room machine is operating. That is, the additional operating time can be assigned according to the additional payment, and the heating phase of the drying operation is additionally performed for the additional operating time. Therefore, the laundry can be properly dried by extending the operating time although the laundry is not properly dried after performing the drying operating for an initially assigned operating time. Also, the customer can control the dryness of the laundry according to the type of clothe and the preference of the customer.

Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A method of operating and managing a laundry room machine, which includes a payment device that collects a payment for operating the laundry room machine and performs a drying course preset according to payment collecting information initially received from the payment device, wherein the drying course is performed sequentially from a heating phase to a cooling phase, wherein hot air is supplied during the heating phase and the hot air is not supplied during the cooling phase, and wherein the payment device allows the payment to additionally be received while the initially preset drying course is being performed, the method comprising:

when payment collecting information is additionally received while the initially preset drying course is being performed, resetting the initially preset drying course according to the additionally received payment collecting information and then performing the reset drying course, wherein if the payment collecting information is additionally received while the cooling phase is being performed, the cooling phase changes to the heating phase.

2. The method of claim 1, wherein, operating conditions of the laundry room machine including the drying course are set through a separate communicator.

3. A method of operating and managing a laundry room machine, which includes a payment device that collects a payment for operating a laundry room machine and performs a drying course preset according to payment collecting information initially received from the payment device, wherein the payment device allows the payment to additionally be received while the initially preset drying course is being performed, the method comprising:

when payment collecting information is additionally received while the initially preset drying course is being performed, resetting the initially preset drying course according to the additionally received payment collecting information and then performing the reset drying course, wherein if an operating time assigned according to the initially preset drying course is longer than a predetermined maximum operating time, the resetting of the initially preset drying course is not performed and only the initially preset drying course is performed although the payment collecting information is additionally received while the initially preset drying course is being performed.

* * * * *